(12) United States Patent
Hench et al.

(10) Patent No.: US 9,051,918 B1
(45) Date of Patent: Jun. 9, 2015

(54) VERTICAL AXIS WIND TURBINE WITH TENSILE SUPPORT STRUCTURE HAVING RIGID OR COLLAPSIBLE VANES

(75) Inventors: Steven C. Hench, Annapolis, MD (US); Charles R. Fralick, Ashburn, VA (US)

(73) Assignee: Leidos, Inc., Reston, VA (US)

( * ) Notice: Subject to any disclaimer, the term of this patent is extended or adjusted under 35 U.S.C. 154(b) by 1122 days.

(21) Appl. No.: 13/035,447

(22) Filed: Feb. 25, 2011

(51) Int. Cl.
F03D 3/06 (2006.01)

(52) U.S. Cl.
CPC .. *F03D 3/06* (2013.01); *F03D 3/061* (2013.01)

(58) Field of Classification Search
USPC ........................................ 290/44, 55; 415/2.1
See application file for complete search history.

(56) References Cited

U.S. PATENT DOCUMENTS

| | | | |
|---|---|---|---|
| 953,891 A | 4/1910 | Atkins | |
| 1,502,511 A | 7/1924 | Marvin | |
| 1,767,995 A | 6/1930 | McChesney | |
| 2,990,803 A | 7/1961 | Henderson | 114/230 |
| 3,001,371 A | 9/1961 | Gilmore, Jr. et al. | 61/48 |
| 3,070,061 A | 12/1962 | Rightmyer | 115/34 |
| 3,231,749 A | 1/1966 | Hink, III | 290/53 |
| 3,654,807 A | 4/1972 | Deskey | 73/180 |
| 3,691,573 A | 9/1972 | Laudato, Jr. | 441/16 |
| 3,763,703 A | 10/1973 | Man | 73/182 |
| 3,800,128 A | 3/1974 | Kurk | 701/21 |
| 3,814,910 A | 6/1974 | Palmieri et al. | 701/21 |
| 3,875,388 A | 4/1975 | Luten et al. | 701/21 |
| 3,881,094 A | 4/1975 | Taylor et al. | 701/21 |
| 3,881,095 A | 4/1975 | Taylor et al. | 701/21 |
| 3,968,353 A | 7/1976 | Kuller | 701/21 |
| 4,110,630 A | 8/1978 | Hendel | 290/53 |
| 4,165,468 A * | 8/1979 | Fry et al. | 290/55 |
| 4,168,556 A | 9/1979 | Fink et al. | 114/264 |
| 4,266,143 A | 5/1981 | Ng | 290/53 |
| 4,317,047 A | 2/1982 | de Almada | 290/53 |
| 4,317,330 A | 3/1982 | Brankovics | |
| 4,340,821 A | 7/1982 | Slonim | 290/53 |
| 4,340,936 A | 7/1982 | Mounce | 701/200 |
| 4,352,023 A | 9/1982 | Sachs et al. | 290/42 |
| 4,405,866 A | 9/1983 | Masuda et al. | 290/53 |
| 4,412,417 A | 11/1983 | Dementhon | |
| 4,423,334 A | 12/1983 | Jacobi et al. | 290/53 |
| 4,438,343 A | 3/1984 | Marken | 290/53 |

(Continued)

FOREIGN PATENT DOCUMENTS

WO WO 2009/018666 12/2009
WO WO 2012/016283 2/2012

OTHER PUBLICATIONS

"Wooden Low-RPM Alternator" [online], Copyright 2000 [retrieved on Mar. 29, 2012], 15 pp., Retrieved From the Internet: http://www.otherpower.com/pmg2.html.

(Continued)

*Primary Examiner* — Tulsidas C Patel
*Assistant Examiner* — Sean Gugger
(74) *Attorney, Agent, or Firm* — Dawn-Marie Bey; Bey & Cotropia PLLC (57) ABSTRACT

A wind power harvesting system includes a turbine having a bottom disk and a top disk and a first and a second panel of collapsible material each attached at a first end thereof to the bottom disk and at a second end thereof to the top disk. The combination of attached panels of material results in the formation of a Savonius shape that rotates in response to the force of the wind. A non-cogging generator is attached to the turbine to produce power therefrom.

18 Claims, 6 Drawing Sheets

(56) References Cited

U.S. PATENT DOCUMENTS

| | | | |
|---|---|---|---|
| 4,490,621 A | 12/1984 | Watabe et al. | 290/42 |
| 4,527,951 A | 7/1985 | Trier | 416/145 |
| 4,531,063 A | 7/1985 | Vielmo et al. | 290/53 |
| 4,549,267 A | 10/1985 | Drabouski, Jr. | 701/124 |
| 4,624,624 A * | 11/1986 | Yum | 416/87 |
| 4,631,921 A | 12/1986 | Linderfelt | 60/501 |
| 4,674,324 A | 6/1987 | Benoit | 73/65.03 |
| 4,708,592 A | 11/1987 | Krolick et al. | 416/176 A |
| 4,748,338 A | 5/1988 | Boyce | 290/42 |
| 4,781,023 A | 11/1988 | Gordon | 60/506 |
| 4,785,404 A | 11/1988 | Sims et al. | 701/200 |
| 4,843,250 A | 6/1989 | Stupakis | 290/53 |
| 4,849,647 A | 7/1989 | McKenzie | |
| 4,851,704 A | 7/1989 | Rubi | 290/53 |
| 4,868,408 A | 9/1989 | Hesh | |
| 4,872,118 A | 10/1989 | Naidenov et al. | 701/124 |
| 4,954,110 A | 9/1990 | Warnan | 441/22 |
| 5,048,356 A | 9/1991 | Levko | 74/60 |
| 5,268,881 A | 12/1993 | Damm | 368/134 |
| 5,341,757 A | 8/1994 | Digiacomo | 114/230.27 |
| 5,411,422 A | 5/1995 | Robertson | 440/48 |
| 5,421,354 A * | 6/1995 | Bolton | 135/19.5 |
| 5,424,582 A | 6/1995 | Trepl, II et al. | 290/53 |
| 5,452,216 A | 9/1995 | Mounce | 701/214 |
| 5,460,099 A | 10/1995 | Matsuhisa et al. | 105/148 |
| 5,499,889 A | 3/1996 | Yim | 405/76 |
| 5,608,160 A | 3/1997 | Chastonay | 73/65.03 |
| 5,696,413 A | 12/1997 | Woodbridge et al. | 310/15 |
| 5,770,893 A | 6/1998 | Youlton | 290/53 |
| 5,789,826 A | 8/1998 | Kumbatovic | 290/53 |
| 5,908,122 A | 6/1999 | Robinett et al. | 212/275 |
| 5,924,845 A | 7/1999 | Bagley et al. | 416/145 |
| 5,929,531 A | 7/1999 | Lagno | 290/53 |
| 6,020,653 A | 2/2000 | Woodbridge et al. | 290/53 |
| 6,106,411 A | 8/2000 | Edwards | 473/292 |
| 6,216,625 B1 | 4/2001 | Baluha | 114/230.27 |
| 6,308,649 B1 | 10/2001 | Gedeon | 114/39.11 |
| 6,441,516 B1 | 8/2002 | Kaelin et al. | 310/36 |
| 6,616,402 B2 | 9/2003 | Selsam | 415/3.1 |
| 6,626,638 B2 | 9/2003 | Rosefsky | |
| 6,647,716 B2 | 11/2003 | Boyd | 60/398 |
| 6,681,572 B2 | 1/2004 | Flory | 60/507 |
| 6,823,810 B2 | 11/2004 | Carlson et al. | 114/125 |
| 6,833,631 B2 | 12/2004 | Van Breems | 290/42 |
| 6,864,614 B2 | 3/2005 | Murray | 310/216 |
| 6,994,047 B1 | 2/2006 | Pent, III | 114/230.27 |
| 7,042,110 B2 | 5/2006 | Mikhail et al. | 290/44 |
| 7,105,939 B2 | 9/2006 | Bednyak | 290/42 |
| 7,143,363 B1 | 11/2006 | Gaynor et al. | 715/771 |
| 7,199,481 B2 | 4/2007 | Hirsch | 290/42 |
| 7,239,038 B1 | 7/2007 | Zimmerman et al. | 290/54 |
| 7,241,105 B1 * | 7/2007 | Vanderhye et al. | 415/4.2 |
| 7,298,054 B2 | 11/2007 | Hirsch | 290/42 |
| 7,362,004 B2 | 4/2008 | Becker | 290/55 |
| 7,375,436 B1 | 5/2008 | Goldin | 290/42 |
| 7,436,082 B2 | 10/2008 | Ruse et al. | 290/42 |
| 7,440,848 B2 | 10/2008 | Anderson | 701/207 |
| 7,453,165 B2 | 11/2008 | Hench | 290/53 |
| 7,538,445 B2 | 5/2009 | Kornbluh et al. | 290/53 |
| 7,557,456 B2 | 7/2009 | Kornbluh et al. | 290/42 |
| 7,625,255 B2 | 12/2009 | Ide et al. | 440/88 M |
| 7,629,704 B2 | 12/2009 | Hench | 290/53 |
| 7,649,276 B2 | 1/2010 | Kornbluh et al. | 290/53 |
| 7,728,454 B1 | 6/2010 | Anderson, Jr. | |
| 2001/0000197 A1 | 4/2001 | Gorlov | 114/274 |
| 2003/0173922 A1 | 9/2003 | Pelonis | 318/439 |
| 2004/0046474 A1 | 3/2004 | Kalsi | 310/179 |
| 2004/0239199 A1 | 12/2004 | Qu et al. | 310/112 |
| 2005/0285407 A1 | 12/2005 | Davis et al. | 290/54 |
| 2006/0153682 A1 * | 7/2006 | Vanderhye et al. | 416/197 A |
| 2007/0137195 A1 | 6/2007 | Tayla et al. | 60/397 |
| 2007/0138793 A1 | 6/2007 | Zimmerman et al. | 290/1 R |
| 2007/0251230 A1 | 11/2007 | Zimmerman et al. | 60/497 |
| 2008/0054639 A1 | 3/2008 | Maier et al. | 290/40 R |
| 2008/0093858 A1 | 4/2008 | Hench | 290/53 |
| 2008/0224472 A1 | 9/2008 | Bean | 290/42 |
| 2008/0265582 A1 | 10/2008 | Hench | 290/53 |
| 2009/0008942 A1 | 1/2009 | Clement et al. | 290/53 |
| 2009/0022597 A1 | 1/2009 | Bowie | |
| 2009/0127856 A1 | 5/2009 | Hench | 290/42 |
| 2009/0160191 A1 | 6/2009 | Beane | 290/53 |
| 2010/0072752 A1 | 3/2010 | Park et al. | 290/52 |
| 2010/0123315 A1 | 5/2010 | Anderson, Jr. | 290/53 |
| 2010/0148512 A1 | 6/2010 | Pitre | 290/54 |
| 2011/0012358 A1 | 1/2011 | Brewster et al. | 290/53 |
| 2011/0081243 A1 * | 4/2011 | Sullivan | 416/120 |
| 2011/0278847 A1 | 11/2011 | Hench et al. | 290/53 |
| 2012/0243994 A1 * | 9/2012 | Saeed | 416/88 |

OTHER PUBLICATIONS

International Search Report and Written Opinion issued for PCT/US2009/031675, dated Mar. 30, 2009, 8 pp.

Timmons, Heather, "Energy From the Restless Sea," The New York Times, Aug. 3, 2006, New York, New York.

"noah li-leger" [online], The Creative World at Work, Copyright 2010 [retrieved on Apr. 16, 2010], 1 p., Retrieved From the Internet: http://www.coroflot.com/public/individual_profile.asp?individual_id=140221&sort_by=1&.

"UBC Entrepreneurs Harness Wave Energy" [online], UBC This Week, Mar. 9, 2006 [retrieved on Apr. 16, 2010], 4 pp., Retrieved From the Internet: http://www.publicaffairs.ubc.ca/ubcthisweek/2006/06mar09.html.

"Wavelength—Wavelength Power Solutions" [online], The Creative World at Work, Copyright 2010 [retrieved on Apr. 16, 2010], 4 pp., Retrieved From the Internet: http://www.coroflot.com/public/individual_file.asp?individual_id=140221&portfolio_id=342501&sort_by=&.

Khan, Jahangir and Bhuyan, Gouri S., "Ocean Energy: Global Technology Development Status," A report prepared by Powertech Labs Inc. for the IEA-OES under Annex I—Review, Exchange and Dissemination of Information on Ocean Energy Systems, IEA-OES Document No. T0104, 83 pp., Mar. 2009.

Brekken, T.K.A., von Jouanne, A. Hai Yue Han, "Ocean Wave Energy Overview and Research at Oregon State University," School of Electr. Eng. & Comp. Sci., Oregon State Univ., Corvallis, OR, Power Electronics and Machines in Wind Applications, PEMWA 2009, IEEE, Jun. 24-26, 2009.

Specification and Drawings for U.S. Appl. No. 12/778,586, filed May 12, 2010, 20 pp.

International Search Report and Written Opinion for Application No. PCT/US2011/027635, dated May 25, 2011, 9 pp.

Alves, Marco, et al., "Hydrodynamic Optimization of a Wave Energy Converter Using a Heave Motion Buoy," *Proceedings of the 6th Int. Conf. on Wave and Tidal Energy*, Porto, Portugal, 2007.

"Pelamis Wave Energy Converter" [online], [retrieved on Apr. 23, 2012], 4 pp., Retrieved From the Internet: http://en.wikipedia.org/wiki/Pelamis_Wave_Energy_Converter.

Evans, Paul, "Ocean-Power Installation Up and Running," gizmag, Mar. 2, 2009 [retrieved on Apr. 23, 2012], 5 pp., Retrieved From the Internet: http://www.gizmag.com/wave-power-owc/11122/.

von Jouanne, A., Brekken, T.K.A., "Creating Energy From Ocean Waves" [online], Wallace Energy Systems & Renewables Facility, Oregon State University, Copyright 2012 [retrieved on Apr. 23, 2012], 2 pp., Retrieved From the Internet: http://eecs.engr.oregonstate.edu/wesrf/.

World Energy Council, "2007 Survey of Energy Resources," Ocean Thermal Energy Conversion, 9 pp.

Kane, M., "California Small Hydropower and Ocean Wave Energy Resources," In Support of the 2005 Integrated Energy Policy Report, Presented at: California Energy Commission, Sacramento, California, 29 pp., May 9, 2005.

Previsic, Mirko, et al., "E21 EPRI Assessment, Offshore Wave Energy Conversion Devices," Electricity Innovation Institute, 52 pp., Jun. 16, 2004.

Bedard, Roger, "Feasibility of Using Wavewatch III for Days-Ahead Output Forecasting for Grid Connected Wave Energy Projects in Washington and Oregon, Stage Gate #2 Final Report, EPRI-WP012," Electric Power Research Institute, 78 pp., Feb. 29, 2008.

(56) References Cited

OTHER PUBLICATIONS

Bedard, Roger, et al., "North American Ocean Energy Status—Mar. 2007," 8 pp.
Rondorf, Neil, "A Virginia-Based Marine Renewable Energy Technologies," Presentation to VRTAC, 19 pp., Sep. 19, 2006.
Koola, Paul Mario, et al., "The Dynamics of Wave Carpet, a Novel Deep Water Wave Energy Design," *Oceans 2003 Proceedings*, vol. 4, pp. 2288-2293, Sep. 22-26, 2003, San Diego, California.
Kim, Jin-Ha, et al., "An Experimental Study on the Reverse Wave Drift Force of a BBDB Type OWC Wave Energy Device," *Proceedings of the Seventh (2006) ISOPE Pacific/Asia Offshore Mechanics Symposium*, pp. 237-242, Dalian, China, Sep. 17-21, 2006.
"Linear Control of Wave Energy Converters" [online], Lancaster University Renewable Energy Group—Wave Energy, [retrieved on Jun. 12, 2012], 3 pp., Retrieved From the Internet: http://www.engineering.lancs.ac.uk/lureg/group_research/wave_energy_research/Linear_C . . . .
"Wind Turbine Power Calculations, RWE npower renewables" [online], Mechanical and Electrical Engineering, Power Industry, The Royal Academy of Engineering, [retrieved on Feb. 24, 2011], 5 pp., Retrieved From the Internet: http://www.raeng.org.uk/education/diploma/maths/pdf/exemplars_advanced/23_Wind_Turbine.pdf.
"Producing Renewable Electricity with a Hybrid, Bluenergy Solarwind Turbine," 2 pp., Copyright 2009-2011, www.bluenergyusa.com.
"Development of the Helical Reaction Hydraulic Turbine," Final Technical Report, Project Period: Jul. 1, 1996-Jun. 30, 1998, Submission to: The US Department of Energy, Prepared by: Dr. Alexander Gorlov, PI, MIME Department, Northeastern University, 59 pp., Aug. 1998.
Rasila, Mika, "Torque and Speed Control of a Pitch Regulated Wind Turbine," Department of Electric Power Engineering, Chalmers University of Technology, Goteborg, Sweden, 67 pp., 2003.

* cited by examiner

Figure 5a

VERTICAL AXIS WIND TURBINE WITH TENSILE SUPPORT STRUCTURE HAVING RIGID OR COLLAPSIBLE VANES

BACKGROUND OF THE INVENTION

1. Field of the Invention

The present embodiments are generally directed to a machine for extracting rotational mechanical energy from naturally occurring wind. More particularly, the embodiments include a tensile mounted Savonius-type turbine for transmitting tensile support loads and capturing wind energy.

2. Description of Existing Art

Small or micro wind energy is one of the fastest growing forms of domestic and residential electricity generation and is a great investment for homeowners and small business owners. Small scale wind turbines can be used for anything that requires a small amount of power such as an electric gate, outdoor lights, pumping water, battery charging and the like.

Figure 1:
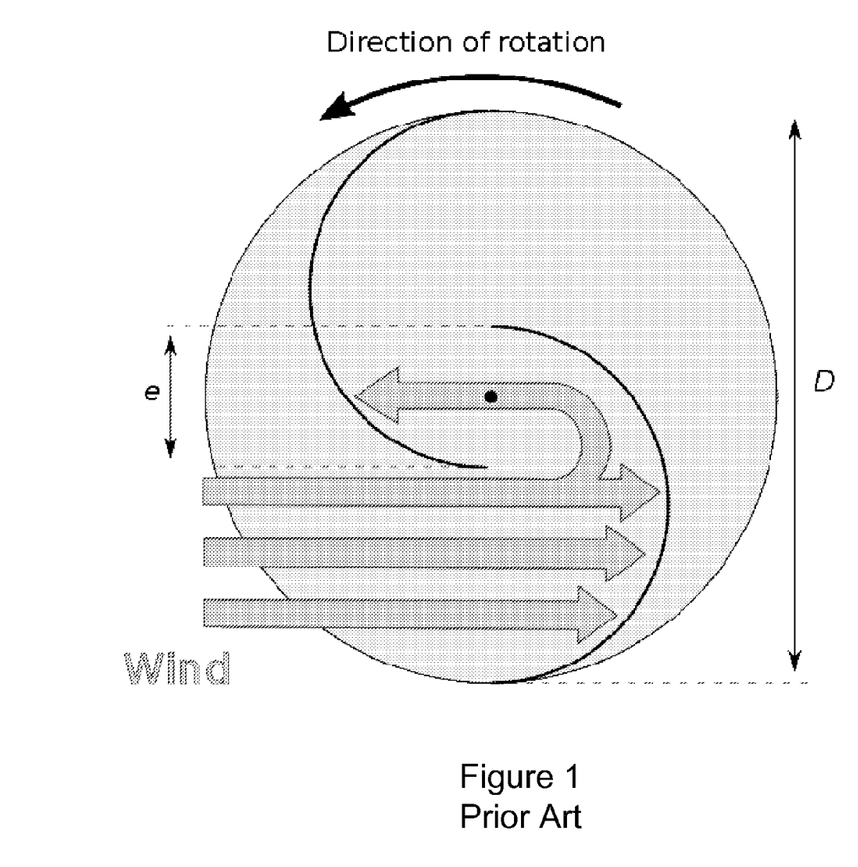
FIG. 1 illustrates a basic prior art Savonius arrangement.

Vertical axis wind turbines (VAWTs) and specifically, Savonius-type VAWTs have existed for many years. FIG. 1 illustrates a basic Savonius arrangement, include wind pattern and resulting rotation. However, practical applications have been limited due to excessive bearing wear if supported from beneath or excessive support structure requirements if supported at each end via rigid mounts. The requirement for rigid mounting and excessive wear increases costs both in terms of time and expense for materials.

Additionally, since Savonius-type turbines generally yield lower power output and thus are generally better suited for residential use, there are safety issues that come into play. A spinning piece of metal is a danger to people, especially children, as well as pets. Further, residential uses can also require a check on both noise and aesthetics as one could likely not erect a noisy, eyesore in their neighborhood.

Further still, given the current mobile, "on-the-go" world in which we live, the ability to generate and access power in various locations to run handheld or other low power devices is desirable. As described above, known VAWTs are stationary in view of the requirement for a rigid mount.

Accordingly, there is a need for a portable, physically robust, adaptable, low power generation VAWT that reduces repairability costs, including time and expense, that is safe, quiet and aesthetically acceptable for residential use.

SUMMARY OF THE INVENTION

A first embodiment is a wind power harvesting system comprising a turbine including: a bottom disk and a top disk; and a first and a second panel of material each attached at a first end thereof to the bottom disk and at a second end thereof to the top disk wherein as a result of the attachments, together the first and second panel of material are capable of forming a Savonius shape, and further wherein the first and second panels of material are collapsible.

A second embodiment is a wind power harvesting system comprising at least two turbines, each including: a bottom disk and a top disk; and a first and a second panel of material each attached at a first end thereof to the bottom disk and at a second end thereof to the top disk wherein as a result of the attachments, together the first and second panel of material are capable of forming a Savonius shape, and further wherein the first and second panels of material are collapsible.

A third embodiment is a method for producing a wind power harvesting system comprising: attaching each of a first and second panel of collapsible material to each of an inner facing side of a bottom disk and top disk, such that each of the first and second panels of material forms a semi-circular shape and a combination of both the first and second panels forms a Savonius configuration; attaching a first tension control component to an outer facing side of the bottom disk and a second tension control component to an outer facing side of the top disk; and attaching a power generating component to at least one of the first tension control component and the second tension control component.

BRIEF DESCRIPTION OF THE FIGURES

The preferred embodiments are illustrated by way of example and are not limited to the following Figures.

DETAILED DESCRIPTION

Various embodiments and aspects of the embodiments will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions. All terms used herein are intended to have their ordinary meaning in the art unless otherwise provided.

Figures 2A, 2B:
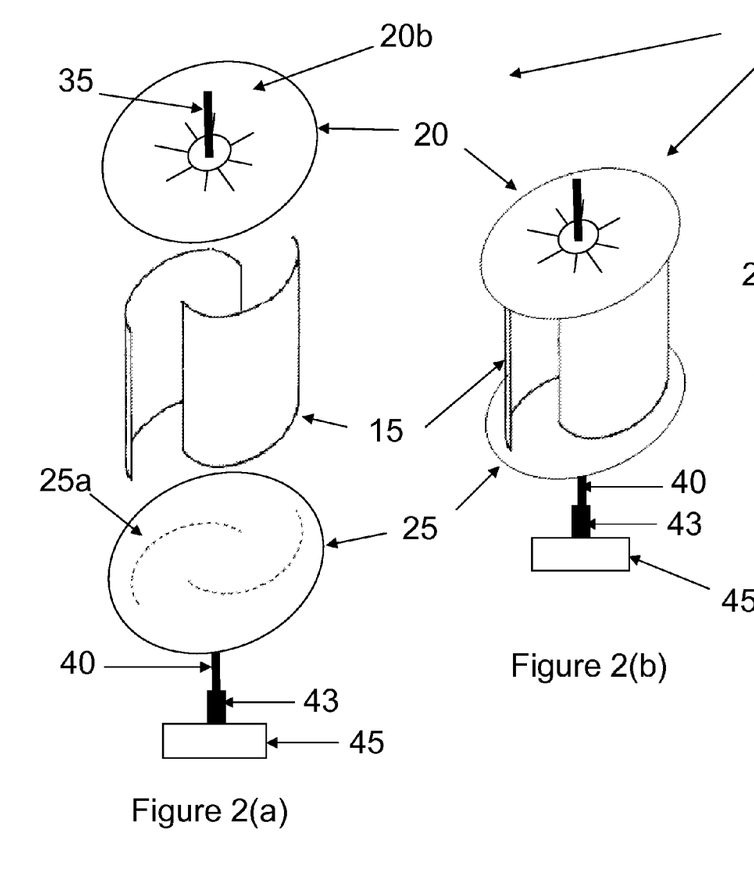
FIGS. 2(a) through 2(c) illustrate various view of furled and unfurled turbine in accordance with an embodiment described herein.
Figure 2C:
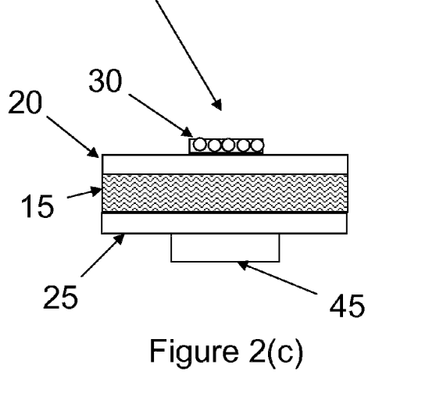

Referring to FIGS. 2a through 2c, a tensile mounted, collapsible structure 10 is shown wherein the semi-circular or hemispherical buckets or vanes 15 (hereafter "vanes") are formed of a collapsible material such as a fabric (e.g., sailcloth) and transmit the tensile support loads through the structure as well as capturing wind energy. The vanes 15 are attached to top 20 and bottom 25 disks, made of suitable rigid material e.g., plywood, fiberglass, aluminum, reinforced foam, corrugated plastic or composites, etc. A rotating bearing 30, either in plane or above the top disk 20, with clevis or eye hook attachment (not shown) is attached to the upper tensile support structure 35, which may be cable, rope, or the like. The vanes 15 are connected to the inner-facing surfaces 20a, 25a (only outer-facing surface 20b is shown for the top disk and only inner facing surface 25a) of the top and bottom disks 20, 25 at connection points (shown as dashed lines C in FIG. 2(a)) by suitable means including glue, staples, stitching or the like. The semi-circular deployed shape of the vanes is determined by the placement of connection points C, as appropriate for a "Savonius" configuration. A preferred aspect ratio, height of vane to diameter of semi-circle formed by vane, of 6 to 8, optimizes performance. The configuration of the vanes is not limited as described, but could include multiple panels in various arrangements.

Any moving material, including wind, carries kinetic energy and momentum. The basic laws of kinematics allow an easy analysis of a first approximation of performance. Essentially, any wind-power mechanism captures energy by slowing down the speed of the wind involved.

The function of a wind turbine is to transform the wind's kinetic energy into electricity. Accordingly, we begin with the calculation of kinetic energy or $E_k$, where:

$$E_k = \frac{1}{2}MV^2$$

And substitute the mass of the air cylinder ($\rho AV = M$) to arrive at $$E_k = \frac{1}{2}\rho AV^3$$

A Savonius vertical-axis wind turbine is a slow rotating, high torque machine that uses predominantly drag (minimal lift possible) to convert the power of the wind into torque on a rotating shaft. The rotation cannot be faster than the approaching wind speed. Because of the "C" curvature, the scoops experience less drag when moving against the wind than when moving with the wind. This differential drag causes the Savonius turbine to spin. Because it spins on a vertical axis, there is no need to have a directional device to keep the unit aligned in the path of the wind like other models. It can catch the wind in any direction and react immediately to changes in wind direction. This type of turbine is considered a "drag style" turbine from an aerodynamic point of view.

The vanes 15 can be made of fabric (e.g., nylon) or any other suitable material (e.g., woven hemp or bamboo) for collapsible version, or suitable rigid material (e.g., fiberglass, aluminum, etc.) for a non-collapsible version. If made from fabric, the vanes are constructed as flat rectangles and attached to the upper and lower disks at appropriate connection points C in order to achieve the desired scoop shape.

The vanes 15 are held to their shape by the tensile forces acting on the entire system, as well as the impinging wind force on the concave (wind-facing) side of each vane, and the cross-flow air pressure acting against the concave side of the back-winded vane. FIG. 1 illustrates wind flow and resulting direction of rotation.

The bottom disk 25 is suitably connected for translating extracted mechanical energy via first a rope, cable or other flexible means 40 which is connected to the center of bottom disk 25 which then connects to rotating shaft 43 which is part of the electrical generator, alternator, or other rotating mechanical working device 45. The rotating shaft 43 may be formed of steel, aluminum, etc. For generator 45, with improvements in non-cogging generator technology, the wind power collected by smaller-scale vertical-axis wind turbines can be more efficiently and effectively captured and utilized. For example, referring generally to the technology described in pending U.S. patent application Ser. No. 12/778, 586 entitled "RADIAL FLUX PERMANENT MAGNET ALTERNATOR WITH DIELECTRIC STATOR BLOCK" the substance of which is incorporated herein by reference in its entirety, one skilled in the art can readily devise a suitable generator for capturing the wind power collected by smaller-scale vertical-axis wind turbines described herein.

In operation, the tensile loads on the system are transmitted from the upper support 35, through the rotating thrust bearing 30, to the top disk 20, through the vanes 15, through the bottom disk 25, through a connector 40 to the rotating shaft 43 of the generator or alternator 45. Thus, each component must be capable of withstanding the maximum design loads as a function of static tension and dynamic tension (caused by wind loading). The more the wind increases, the higher the tensile loads on the turbine.

The embodiments described herein do not require the shaft to pass through the vanes which leaves the air space around the vanes unblocked, thus maximizing power coefficient.

Deployment or unfurling of the collapsible structure is performed by pulling the top and bottom disks 20, 25, which are connected by/to the vanes 15, in opposite directions (usually vertically) by the tensile support members 30, 40, stretching the vanes into shape. Referring to FIG. 2c, by way of particular example, in the furled position, the bottom disk 25 rests on the generator 45, with the slack lower support rope (not shown) attaching the two therebetween, with the collapsed vanes 15, top disk 20, connecting lines (not shown), thrust bearing 30, slack upper support (not shown) further resting thereon. When collapsed, the turbine may be stored in a soft or hard shell container, improving portability. Alternatively, or in addition thereto, fasteners, such as straps formed of Velcro or having snaps or the like, could be used to maintain the collapsed state of the turbine by attaching the top and bottom disks at the edges.

Figures 3A, 3B:
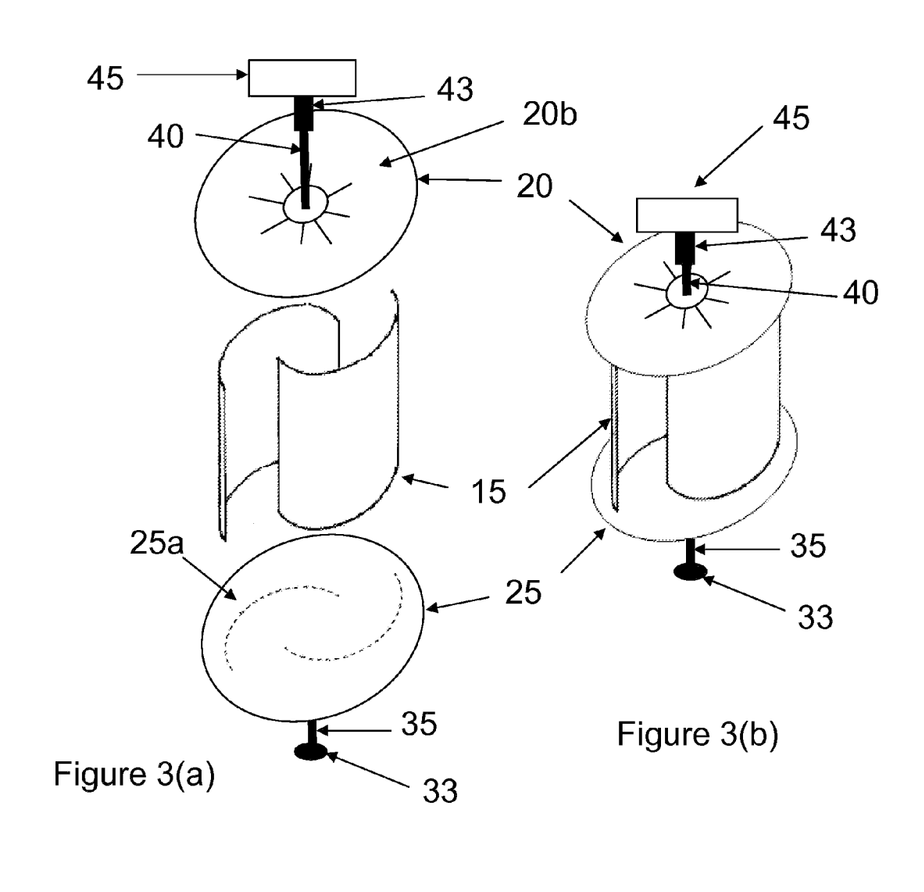
FIGS. 3(a) and 3(b) illustrate various views of an inverted turbine in accordance with an embodiment described herein.

Referring to FIGS. 3a and 3b, in an alternative configuration, the entire assembly described with respect to FIGS. 2a through 2c can be set up to operate inverted, i.e. with the generator 45 at the top of the system and the turbine(s) suspended beneath. A freely suspended embodiment can be built in the inverted mode, with the generator fixed at the top, connected to the turbine, and a heavy weight 33 affixed to or incorporated into the bottom disk. In this embodiment, the device would "swing" to some extent in stronger winds. Alternatively, the system could be anchored at the bottom and not free swinging.

Figure 4A:
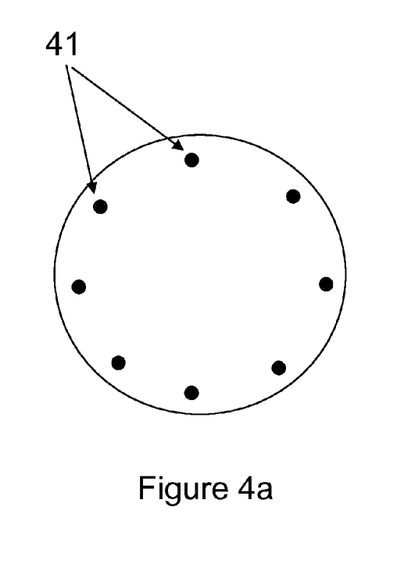
FIG. 4 illustrates a multiple turbine configuration in accordance with an embodiment described herein.
Figure 4B:
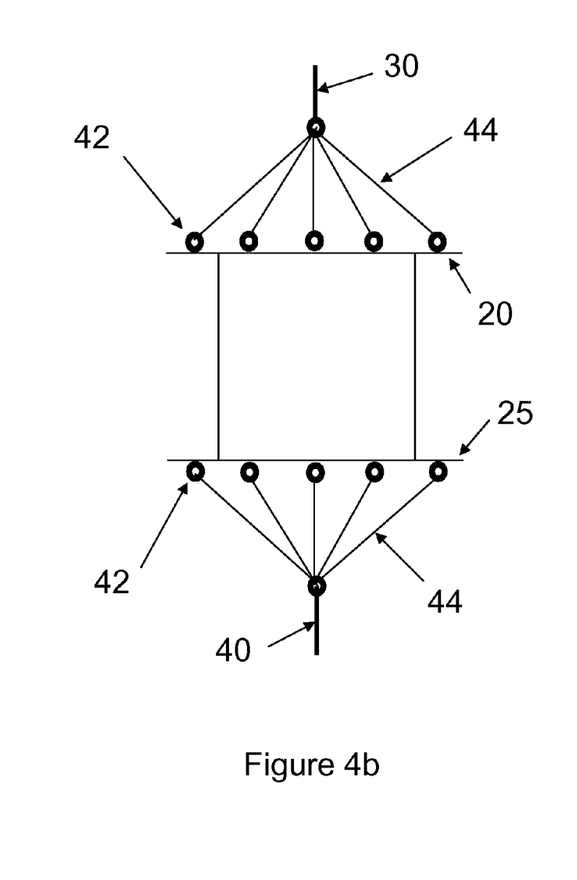

In an alternative configuration, FIGS. 4a and 4b illustrate a particular example wherein the tensile support members 30, 40 could be attached to the top and bottom disks 20, 25 by rope, cable, and other means 44 at eye hooks 42 or other connection means located at connection points 41. The configuration resembles macrame lines. This particular macrame configuration could be on both ends or just a single end of the turbine.

Figure 5A:
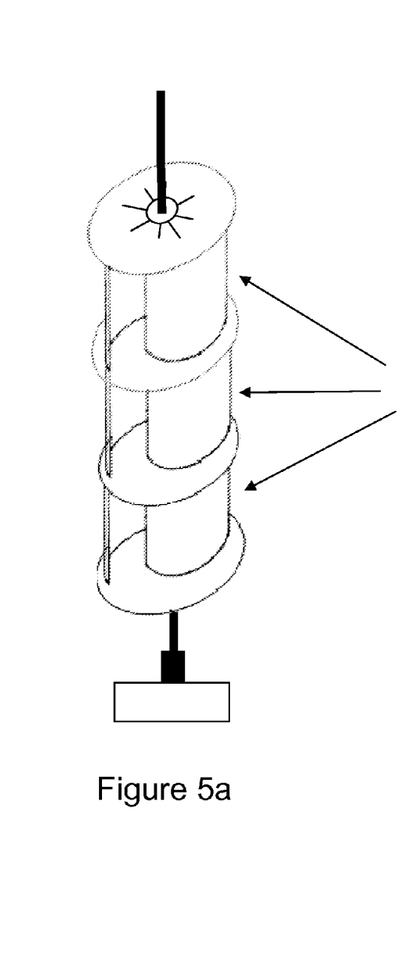
FIGS. 5(a) and 5(b) illustrate furled and unfurled views of the turbine as part of a hoisting system in accordance with an embodiment described herein.
Figure 5B:
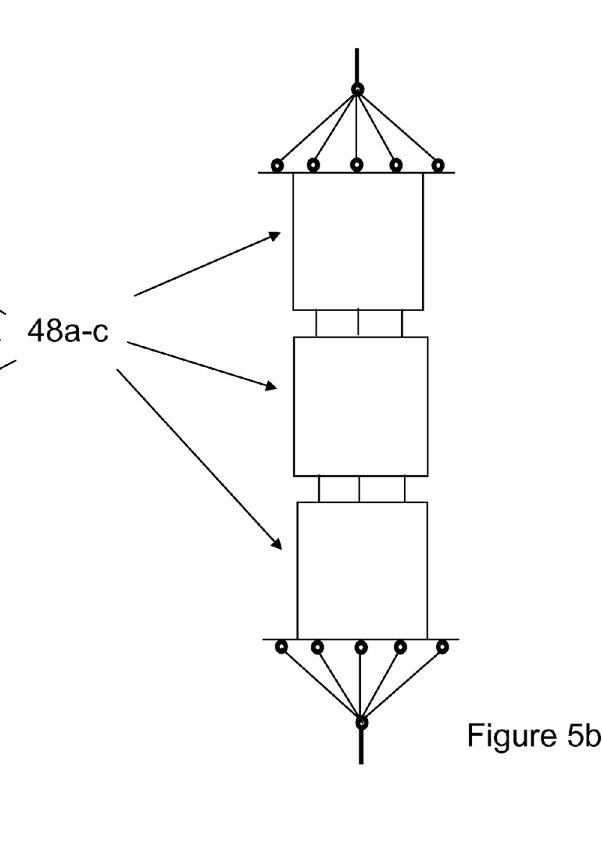

Referring to FIGS. 5a and 5b, yet another embodiment utilizes multiple turbines stacked in a single tensile configuration, wherein only the top/bottom unit requires a rotating bearing. The individual turbines 48a-c are attached to each other using any known securing means including but not limited to glue, clips, nails, screws or the like and could even share a common disk at the point of connection (see FIG. 5a). This enables the torque from several turbines to be combined for output to a single generator. Alternatively, the turbines could be connected, but separated by some amount by flexible means such as rope, cable, etc. at the point of connection (see FIG. 5b). As with the single turbine configurations described above, this configuration can be inverted.

Furling of the system is accomplished by relaxing the tension on the top support and allowing the disks to collapse together, forming a cookie-like configuration with the collapsed fabric vanes sandwiched between the two disks. Furling can be accomplished in a matter of seconds, and used as a means of securing the turbine when not needed, for portability or stowing, or in the event of strong winds.

Similarly, another means of reducing or stopping power output on the device entails the use of "snuffer sock," which can be pulled over the deployed device, thereby cutting down or off the wind flow to the vanes. A snuffer may be used in combination with deployment and furling, to prevent rotation until completely deployed and to stop rotation prior to furling. The snuffer sock material may be fabric or any other suitable material.

Figure 6A:
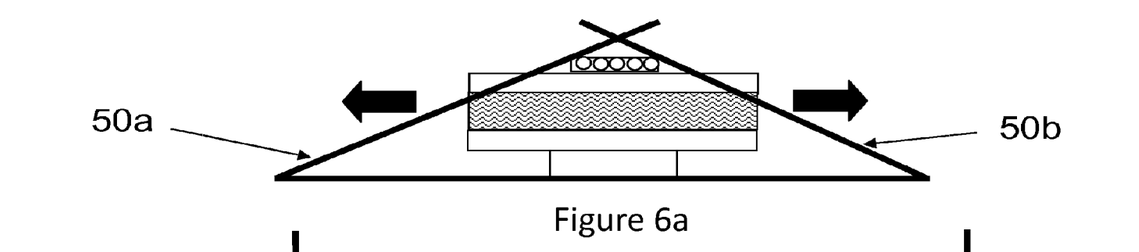
FIGS. 6a and 6b illustrate an exemplary hoisting system for unfurling a turbine described herein.
Figure 6B:
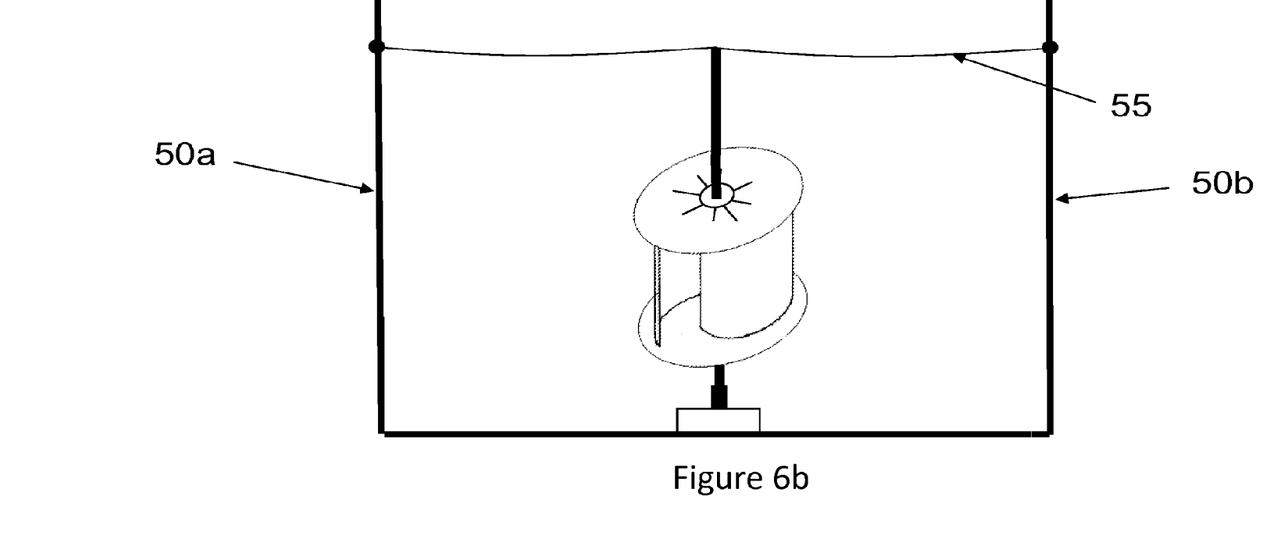

FIGS. 6a and 6b illustrate just one example of a hoisting system for unfurling the turbine. Two crossing masts 50(a) and 50(b) with a line 55 between them that is connected to the turbine, comes up in accordance with the directional arrows indicated through manual or mechanized means and the line 55 pulls the turbine to the unfurled position as indicated in FIG. 6b.

Generally, the portable embodiments described herein offer an improved power source for generating power in the range of 1 Watt up to multiple Kilowatts and offers at least the following advantages over existing vertical axis wind turbines: reduced cost due to need for fewer bearings and use of fabric vanes and resulting decrease in maintenance time and materials, e.g., replacement of bearings; elimination of destructive torque loads on support mounts; portability, e.g., collapsible assembly to greater than 10:1 ratio and fabric vanes are lighter in weight; on-demand furling in case of excessive wind speeds; safety concerns reduced or eliminated with replacement of sharp edge injuries, relative to rigid vanes; turbine can be hoisted into working position from any available structure of opportunity that is taller than the height of the turbine (e.g., mast, flagpole, trees (from or between), buildings, etc.). One skilled in the art can, without undue experimentation, optimize the size, dimensions and materials using the description set forth herein in order to achieve various outputs. The trade-offs between size, mounting, materials and power generation are well within the scope of this description and would be appreciated by one skilled in the art.

The applications for the portable vertical turbine system described herein are unlimited. For example, the systems described herein are ideal for use on boats and beaches, including beach houses. The power generated could be stored or used to as needed to power various electronic devices or recharge batteries.

The invention claimed is:

1. A wind power harvesting system comprising:
   A turbine consisting of:
      a bottom disk and a top disk; and
      a first panel of collapsible material comprising a rectangular shape and a second panel of collapsible material comprising a rectangular shape, each panel attached at a first end thereof to the bottom disk and at a second end thereof to the top disk by a securing means such that each panel forms a semi-circle at each point of attachment to the first and second disks, wherein as a result of the attachments, together the first and second panel of collapsible material form a first configuration having a Savonius shape when the first and second panels of collapsible material are held in tension, and forming a second, collapsed configuration when not held in tension, wherein a second height of the turbine in the second, collapsed configuration is substantially reduced from a first height of the turbine in the first configuration.

2. The wind power harvesting system according to claim 1, further comprising:
   a first attachment component attached at a first end to the bottom disk and a second attachment component attached at a first end to the top disk, wherein the first and second attachment components are configured to hold the first and second panel in tension.

3. The wind power system according to claim 2, further comprising:
   a power generating component attached to at least one of a second end of either the first or second attachment components capable of harvesting wind power generated when the turbine is caused to rotate by the force of the wind.

4. The wind power harvesting system according to claim 2, wherein the first and second attachment components are formed of at least one of rope or cable.

5. The wind power harvesting system according to claim 1, wherein a preferred ratio of a height of each of the first and second panels of material to a diameter of the semi-circle is in the range of 6:1 to 8:1.

6. The wind power harvesting system according to claim 1, wherein the first and second panels of material are formed of fabric.

7. The wind power harvesting system according to claim 2, wherein the first attachment component is attached at a second end to a weight and the second attachment component is attached at a second end to a power generating component.

8. The wind power harvesting system according to claim 7, wherein the power generating component is non-cogging.

9. The wind power harvesting system according to claim 1, wherein the first height of the turbine in an uncollapsed state the first configuration is at least 10 times the second height of the turbine in the second, collapsed configuration.

10. A wind power harvesting system comprising:
    at least two turbines, each of the at least two turbines consisting of:
       a bottom disk and a top disk; and
       a first panel of collapsible material comprising a rectangular shape and a second panel of collapsible material comprising a rectangular shape, each panel attached at a first end thereof to the bottom disk and at a second end thereof to the top disk by a securing means such that each panel forms a semi-circle at each point of attachment to the first and second disks, wherein as a result of the attachments, together the first and second panel of collapsible material form a first configuration having a Savonius shape when the first and second panels of collapsible material are held in tension, and forming a second, collapsed configuration when not held in tension, wherein a height of the turbine in the second, collapsed configuration is substantially reduced from a height of the turbine in the first configuration.

11. The wind power harvesting system according to claim 10, wherein the at least two turbines are attached in a stacked configuration, and further wherein the at least two turbines are secured to one another by glue, clips, nails or screws.

12. The wind power harvesting system according to claim 11, wherein the stacked configuration has an uppermost top disk and lowermost bottom disk, and
    further wherein a first attachment component is attached at a first end thereof to a bottom facing side of first the lowermost bottom disk and a second attachment component is attached at a first end thereof to a top facing side of the uppermost top disk, wherein the first and second attachment components are configured to hold the first and second panels of the at least two turbines in tension.

13. The wind power system according to claim 12, further comprising:
    a power generating component attached to at least one of a second end of either the first or second attachment components capable of harvesting wind power generated when the at least two turbines are caused to rotate by the force of the wind.

14. The wind power harvesting system according to claim 12, wherein the first and second attachment components are formed of at least one of rope or cable.

15. The wind power harvesting system according to claim 10, wherein a preferred ratio of a height of each of the first and second panels of material to a diameter of the semi-circle is in the range of 6:1 to 8:1.

16. The wind power harvesting system according to claim 10, wherein the first and second panels of material are formed of fabric.

17. The wind power harvesting system according to claim 11, wherein the first attachment component is attached at a second end to a weight and the second attachment component is attached at a second end to a power generating component.

18. The wind power harvesting system according to claim 17, wherein the power generating component is non-cogging.

* * * * *